(12) United States Patent
Chen

(10) Patent No.: US 6,758,783 B1
(45) Date of Patent: Jul. 6, 2004

(54) AUTOMATIC SPEED SHIFTING DEVICE

(75) Inventor: Ting-Kuang Chen, Keelung (TW)

(73) Assignee: Power Network Industry Co., Ltd., Taoyuan (TW)

( * ) Notice: Subject to any disclaimer, the term of this patent is extended or adjusted under 35 U.S.C. 154(b) by 0 days.

(21) Appl. No.: 10/394,807

(22) Filed: Mar. 22, 2003

(51) Int. Cl.[7] ............................. F16H 3/74; F16H 35/10
(52) U.S. Cl. ....................................... 475/266; 475/299
(58) Field of Search ................................. 475/266, 299

(56) References Cited

U.S. PATENT DOCUMENTS 4,834,192 A * 5/1989 Hansson ..................... 173/178
5,897,454 A * 4/1999 Cannaliato ................... 475/265

* cited by examiner

Primary Examiner—Dirk Wright

(57) ABSTRACT

An automatic speed shifting device includes a frame having a transmission device and a torque feedback device received therein. The torque feedback device has a torque resistant member so that when the load torque is smaller than its resistant torque, the speed reduction mechanism of the transmission device is remained at the first stage speed status. When the load torque is larger than its resistant torque, a pushing wheel devices a clamp to compress a shifting gear so that the speed reduction mechanism is shifted to another stage of speed. The speed reduction mechanism of the transmission device automatically shifts the speed reduction mechanism when the load torque increases or reduces such that the mechanical efficiency of the transmission device can be increased.

2 Claims, 5 Drawing Sheets

AUTOMATIC SPEED SHIFTING DEVICE

FIELD OF THE INVENTION

The present invention relates to an automatic speed shifting device which employs a torque feedback device to change the position of a shift gear so as to engage corresponding shifting member in the transmission device. The speed reduction device automatically shifts the transmission device when the load torque increases or reduces.

BACKGROUND OF THE INVENTION

A conventional power transmission device, especially for electric spinning tools, such as electric drills and electric screwdrivers, includes a multiple-stage power transmission device and a speed reduction device is used to provide multiple speeds or torque. Generally, the speed reduction device is composed of a planetary gear system and clutch or driving members in the speed reduction device are manually controlled such that some parts are fixed or moved in the planetary gear system and the purposes of speed reduction of output or input can be achieved. An operator has to judge the situation of the tool and then decide to operate the manual device to activate proper speed reduction device to obtain desired torque or revolutions of speed. It is difficult to make the efficiency of the driving motor optimized by the manual operation. Therefore, a feedback device for the load torque is needed so as to shift proper steps of the speed reduction device.

SUMMARY OF THE INVENTION

In accordance with an aspect of the present invention, there is provided an automatic speed shifting device that comprises a frame having a transmission device and a torque feedback device received therein. The frame has a plurality of triangle shaped slots defined through a wall thereof. A radial groove is defined through the wall of the frame. A plurality of protrusions extending from an inside of the frame and ridges are defined on an outer surface of the frame. The transmission device has a shifting gear that has inner teeth that are engaged with first planet gears and second planet gears. The shifting gear has an annular groove with which a plurality of pins on a clamp are engaged so as to retain the shifting gear in a first stage speed position and to engage the shifting gear with the two planet gears, or retain the shifting gear in a second stage speed position and only engage the shifting gear with the second planet gears. The torque feedback device has a pushing wheel, a C-shaped clamp and a compression spring. The pushing wheel has a lever extending from an outer surface thereof and the clamp has a plurality of pin extending through the slots of the frame and engaged with the annular groove of the shifting gear. An elongate hole is defined through the clamp and located corresponding to the radial groove of the frame and the lever of the pushing wheel. The compression spring is mounted to the frame and retained between rides and the ridges on the frame. When the pushing wheel is rotated, the lever is moved in the radial groove of the frame and drives the clamp via the elongate hole in the clamp. The clamp compresses the compression spring by a movement along an inclined surface of the radial groove of the frame so as to generate resistant force.

When the torque applied on the pushing wheel from the front speed reduction gear cannot overcome the resistant force from the torsion spring and the compression spring, the shifting gear is in its first stage of speed status and is engaged with the first planet gears and the second planet gears. When the torque applied onto the pushing wheel overcomes the resistant force from the torsion spring and the compression spring, the pushing wheel rotates and drives the clamp to rotate the shifting gear, and the shifting gear is not rotated due to the engagement of the notches and the protrusions.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
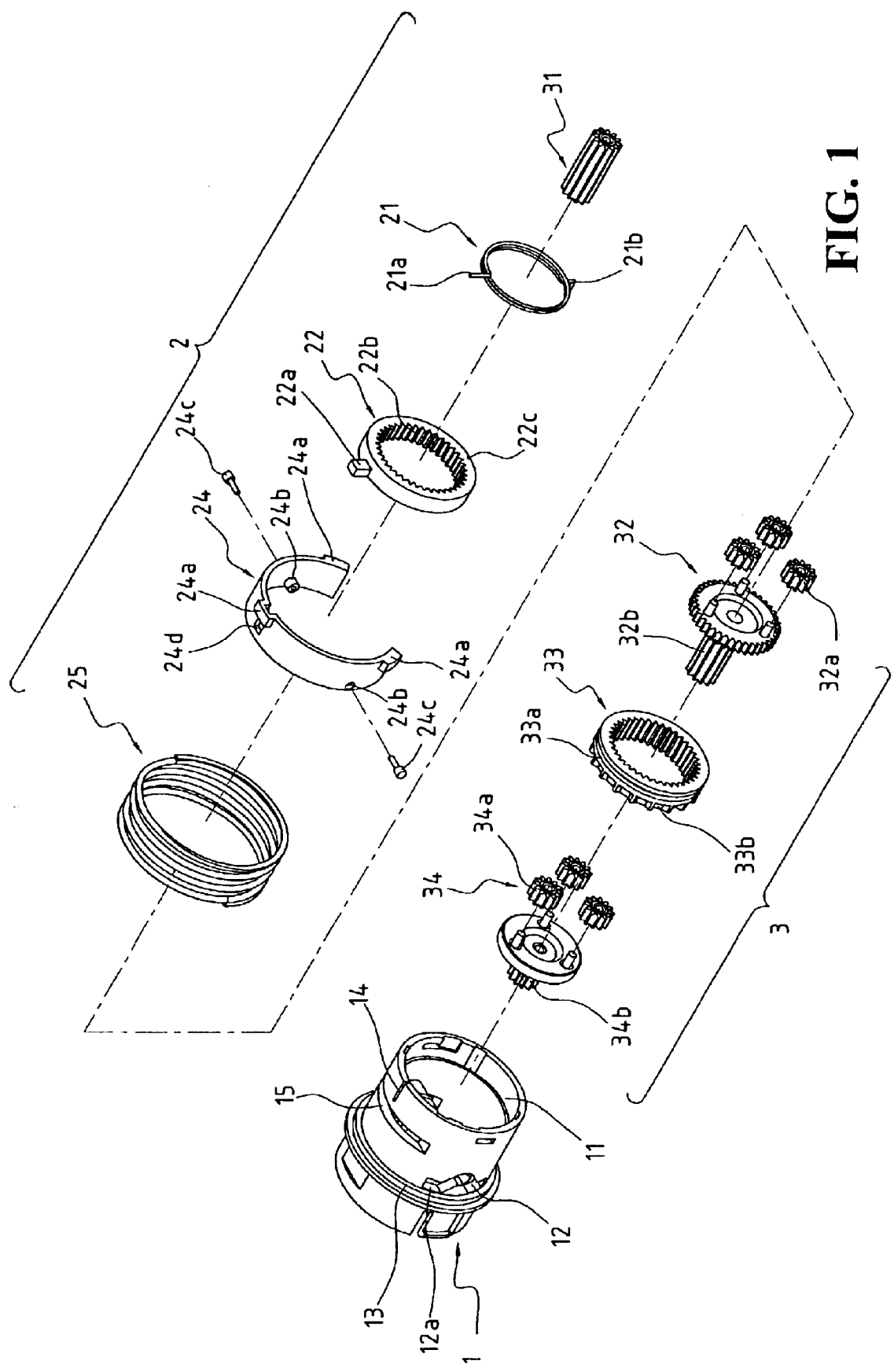
FIG. 1 is an exploded view of an automatic speed shifting device constructed in accordance with the present invention.
Figure 2:
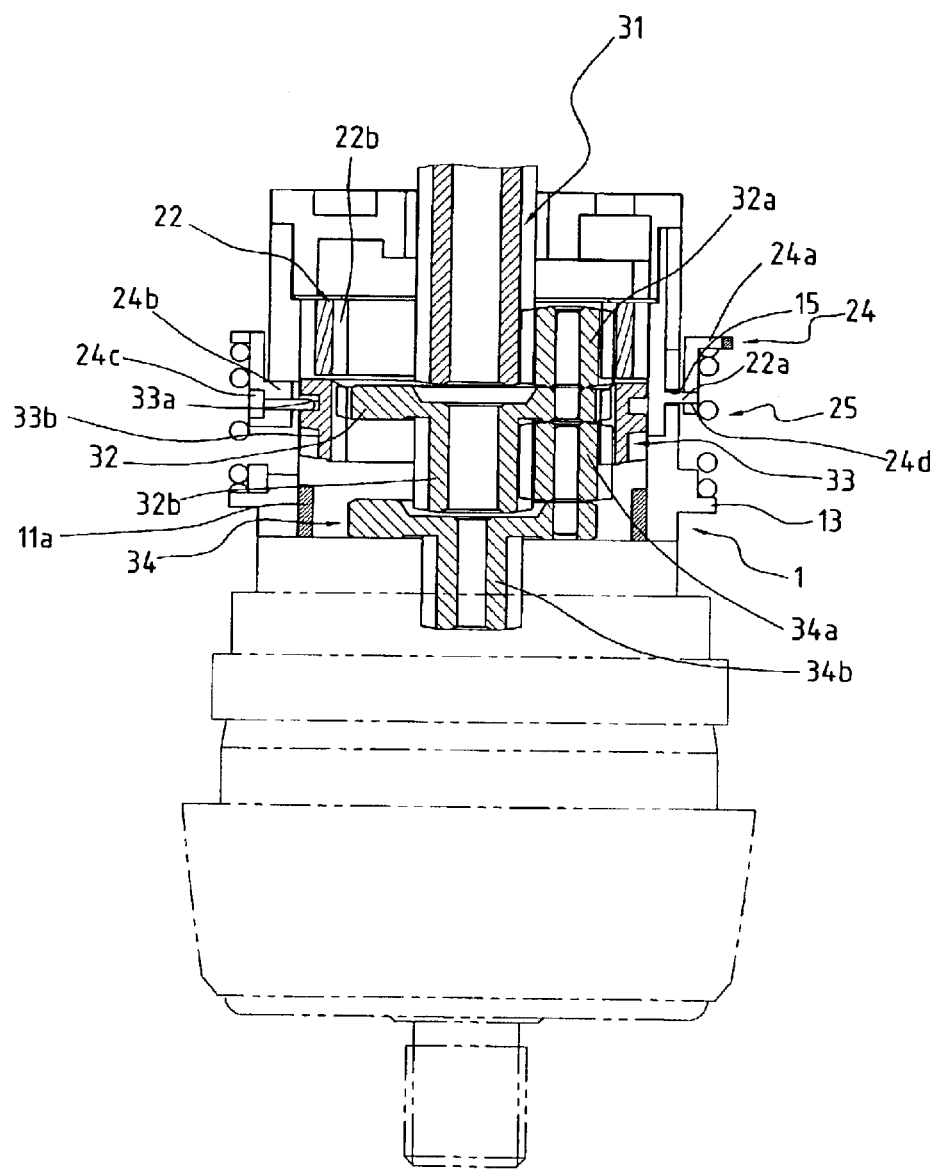
FIG. 2 is a cross-sectional view of the automatic speed shifting device in a first stage.
Figure 3:
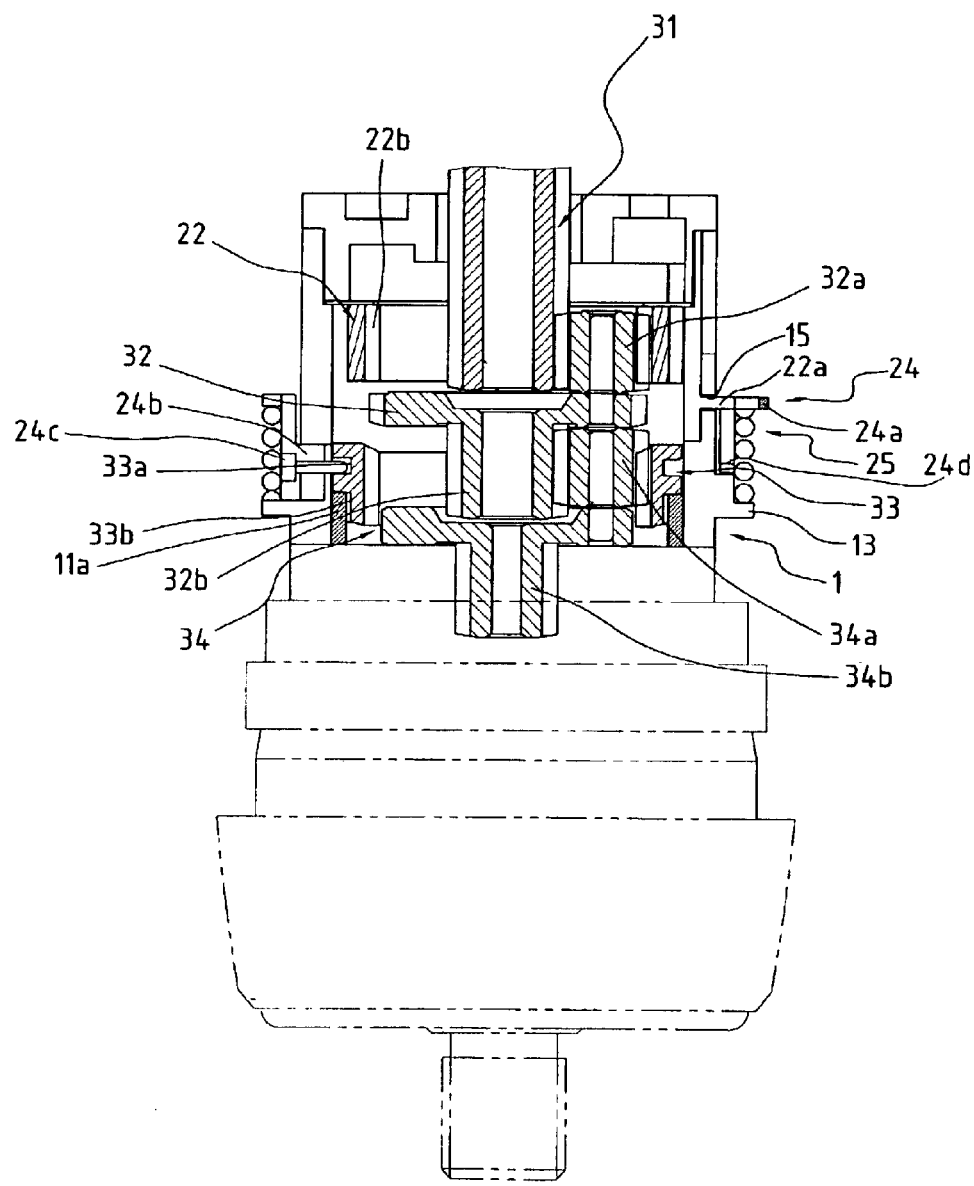
FIG. 3 is a cross-sectional view of the automatic speed shifting device in a second stage.

Referring to FIGS. 1 and 2, an automatic speed shifting device of the present invention comprises a frame 1, a torque feedback device 2 and the transmission device 3. The frame 1 is a cylindrical case and has a hollow chamber 11. A plurality of protrusions 11a extends from an inside of the chamber 11. A plurality of triangle shaped slots 12 is defined through the wall of the frame 1 in the longitudinal direction and each slot 12 includes a peak portion and a base from which two recesses 12a are defined in communication with two ends of the base. A plurality of ridges 13 extends from an outer surface of the frame 1 and is located close to the base of the slots 12. A slit 14 is defined in the wall of the open end of the chamber 11 and a radial groove 15 defined through the wall of the frame 1.

The torque feedback device 2 includes a torsion spring 21, a pushing wheel 22, a C-shaped clamp 24 and a compression spring 25. The pushing wheel 22 has a lever 22a extending from an outer surface thereof, and inner threads 22b are defined in an inner periphery of the pushing wheel 22. A surface groove 22c is defined longitudinally in the outer surface of the pushing wheel 22. A plurality of lugs 24a extends from an outer surface of the clamp 24 and a plurality of pin holes 24b is defined through the clamp 24 and located corresponding to the slots 12 in the frame 1. Each pin hole 24b receives a pin 24c. An elongate hole 24d is defined through the clamp 24 and located corresponding to the radial groove 15 and the lever 22a. The compression spring 25 is mounted to the frame 1 and retained between the ridges 13 of the frame 1 and the lugs 24a of the clamp 24. The compression spring 25 is deformable by movement of the clamp 24 in the axial direction. The torsion spring 21 has a first end 21a that is engaged with the surface groove 2c of the pushing wheel 22, and a second end 21b that is engaged with the slit 14 of the frame 1 so as to maintain the pushing wheel 22 to face the frame 1.

The transmission device 3 includes an input gear 31, a front speed reduction gear 32, a shifting gear 33 and a rear speed reduction gear 34. The input gear 31 is connected to an input power source that is not shown. The front speed reduction gear 32 includes a plurality of planet gears 32a on one side thereof and a driving gear 32b on the other side of the front speed reduction gear 32 so as to transmit power to the rear speed reduction gear 34. The planet gears 32a are engaged with inner teeth 22b of the pushing wheel 22 and the input gear 31 so as to form a planetary speed reduction mechanism. The shifting gear 33 has an annular groove 33a in an outer surface thereof and a plurality of notches 33b are defined in the outer surface of an end of the shifting gear 233. The pins 24c extend through the slots 12 in the frame 1 and are engaged with the annular grooves 33a. The protrusions 11a of the frame 1 are engaged with the notches 33b. The rear speed reduction gear 34 is a disk and is connected to a plurality of planet gears 34a on one end and the other end of the disk is connected to an output gear 34b so as to transmit power to an output mechanism that is not shown. The planet gears 34a are engaged with the drive gear 32b and the inner teeth of the shifting gear 33.

Figure 4A:
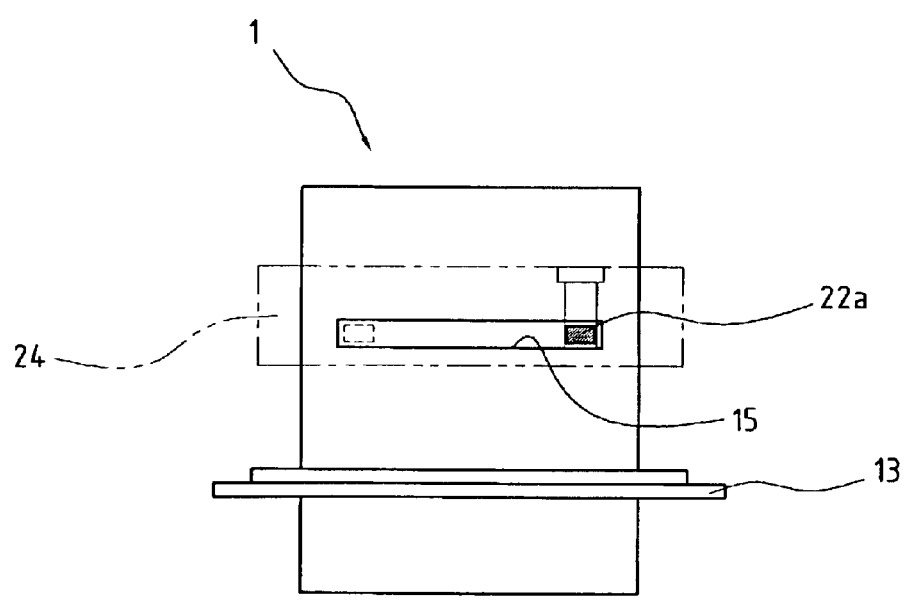
FIG. 4A shows a front view of the speed shifting device of the present invention at the first stage of speed.
Figure 4B:
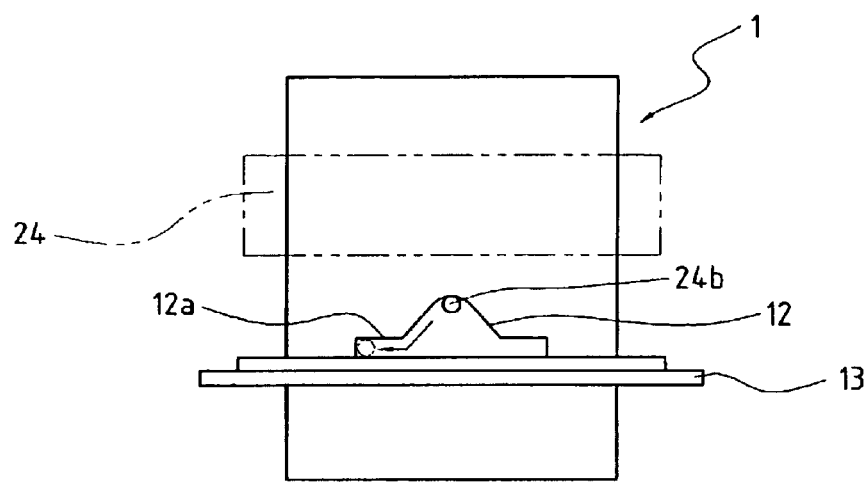
FIG. 4B shows a right side view of the speed shifting device of the present invention in the first stage.
Figure 4C:
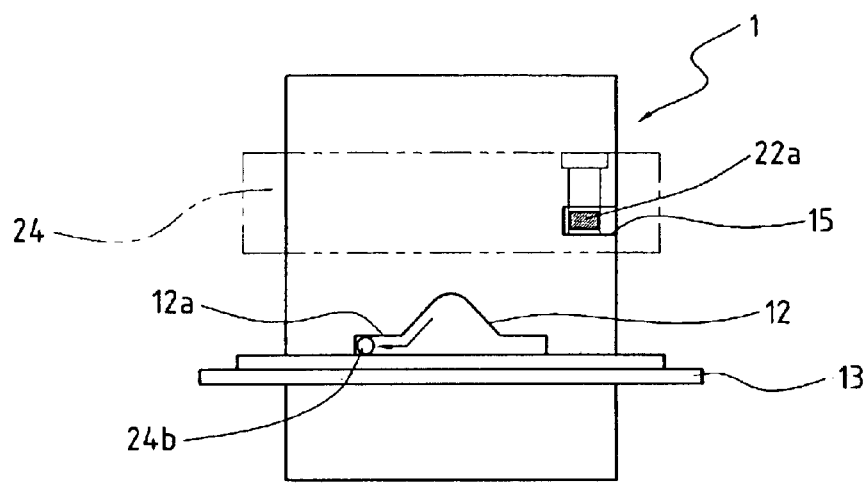
FIG. 4C shows a left side view of the speed shifting device of the present invention in the second stage.

The receiving chamber 11 receives the transmission device 3 and the torque feedback device 2 in sequence. In a first stage of speed, the clamp 24 is retained by the torsion spring 25 and the pins 24c are located at the peak portion of the slots 12, and the pins 24c are engaged with the annular groove 33a of the shifting gear 33, so that the shifting gear 33 is located at a top most position. As shown in FIGS. 4A and 4B, the lever 22a of the pushing wheel 22 is engaged with the radial groove 15 of the frame 1 so that the rotation angle is limited. The angle of the lever 22a is also limited by the retaining of the torsion spring 21 and the clamp 24.

Referring to FIGS. 3, 4A, 4B, and 4C, when the a large resistant torque is applied, the input gear 31 of the transmission mechanism 3 increases the torque of the front speed reduction gear 32 gradually so that the planet gears 32a of the front speed reduction gear 32 apply an reaction force in reverse direction to the inner threads 22b of the pushing wheel 22 so as to rotate the pushing wheel 22. Nevertheless, the pushing wheel 22 rotates only when the force of the torsion spring 21 and the force of the compressing spring 25 are overcome. When the pushing wheel 22 rotates, the lever 22a drives the clamp 24 via the elongate hole 24d. When the clamp 24 rotates, the pins 24c are lowered along the inclined surface of the radial groove 15 in the frame 1 so that the clamp 24 depresses the compression spring 25. Under the circumstance, the pins 24c drive the shifting gear 33 downward till the torque that the front speed reduction gear 32 applies onto the pushing wheel 22 reaches a pre-set value, the pushing wheel 22 rotates a largest angle. The shifting gear 33 reaches the lower most position and the notches 33b are engaged with the protrusions 11a of the frame 1.

The torque of the shifting speed reduction mechanism can be decided by choosing proper torsion spring 21 and the compression spring 25.

The automatic shifting device can be used as a power transmission device in electric drills. When drilling, if a small amount of torque is required, the torque applied on the pushing wheel22 from the front speed reduction gear 32 cannot overcome the resistant force from the torsion spring 21 and the compression spring 25, so that the pushing wheel 22 does not rotate. The shifting gear 33 is in its first stage and is engaged with the planet gears 34a of the rear speed reduction gear 34 and the front speed reduction gear 32. The shifting gear 33 provides a first stage when the front speed reduction gear 32 co-rotates with the rear speed reduction gear 34. The result is located in the maximum value of the curve of the torque vs. revolution. If a large torque is required, the input gear 31 increases the torque gradually and the torque applied onto the pushing wheel 22 from the front speed reduction gear 32 overcomes the resistant force from the torsion spring 21 and the compression spring 25. The number of the revolution of the pushing wheel 22 increases when the torque increases and the shifting gear 33 is in its lower most position and disengages from the front speed reduction gear 32. In the meanwhile, the shifting gear 33 is still engaged with the planet gears 34a of the rear speed reduction gear 34. The shifting gear 33 is not rotated due to the engagement of the notches 33b and the protrusions 11a. This provides the first stage of speed and the result is located in the maximum value of the curve of the torque vs. revolution.

While we have shown and described the embodiment in accordance with the present invention, it should be clear to those skilled in the art that further embodiments may be made without departing from the scope of the present invention.

What is claimed is:

1. An automatic speed shifting device comprising:

a frame having a transmission device and a torque feedback device, the frame having a plurality of triangle shaped slots defined through a wall thereof, a radial groove defined through the wall of the frame, a plurality of protrusions extending from an inside of the frame and ridges defined on an outer surface of the frame;

the transmission device comprising a shifting gear which has inner teeth which are engaged with first planet gears and second planet gears, the first planet gears having a front speed reduction gear and the shifting gear having an annular groove, a plurality of notches defined in the outer surface of the shifting gear so as to engage with the protrusions of the frame;

the torque feedback device having a pushing wheel, a C-shaped clamp and a compression spring, the pushing wheel having a lever extending from an outer surface thereof, the clamp having a plurality of pin extending through the slots of the frame and engaged with the annular groove of the shifting gear, an elongate hole defined through the clamp and located corresponding to the radial groove of the frame and the lever of the pushing wheel, the compression spring mounted to the frame and biased between rides and the ridges on the frame;

each triangle shaped slot of the frame including a peak portion and a base from which two recesses defined in communication with two ends of the base;

when the pushing wheel is rotated, the lever moved in the radial groove of the frame and driving the clamp via the elongate hole in the clamp, the clamp compressing the compression spring by a movement along an inclined surface of the radial groove of the frame so as to be adapted to generate resistant force;

the clamp having a plurality of pins which are inserted in the triangle shaped slots and retained thereby, the pins engaged with the annular groove of the shifting gear so as to selectively retain the shifting gear in an upper most position and engage with the first planet gears and the second planet gears and to selectively retain the shifting gear in a lower most position and engaged with the second planet gears only;

when the shifting gear is in the upper most position, the shifting gear co-rotating with the first planet gears and the second planet gears;

when the shifting gear is in the lower most position, the notches of the shifting gear engaged with the protrusions of the frame and being remained still.

2. The device as claimed in claim 1, wherein the torsion feedback device has a torsion spring that has a first end fixed to the pushing wheel, and a second end fixed to the frame.

* * * * *